1

3,257,469
ALCOHOLS BY SELECTIVE HYDROLYSIS OF OLEFINS
Stephen M. Kovach, Highland, Ind., assignor to Sinclair Research, Inc., Wilmington, Del., a corporation of Delaware
No Drawing. Filed Apr. 2, 1962, Ser. No. 184,509
2 Claims. (Cl. 260—641)

The present invention relates to the selective hydration of isoamylenes in admixture with n-amylenes to obtain tertiary amyl alcohols.

The market for olefin polymers is developing rapidly and is contingent upon a cheap and steady supply of olefins. Cis-polyisoprene has proved to have the properties of natural rubber and is being commercially based upon a cheap source of isoamylenes. Most cheap sources of isoamylenes, however, also have in admixture n-amylenes which have boiling points close to that of the isoamylenes and therefore present difficulties with regard to separation. The present invention provides a process for the separation of the isoamylenes by selectively hydrating the isoamylenes when in admixture with n-amylenes to afford tertiary alcohols. The tertiary alcohols may then be separated and easily reconverted to isoamylenes by conventional dehydration processes. The present invention also provides a process for obtaining selective yields of tertiary alcohols from mixtures of iso- and normal amylenes.

The use of sulfonated hydrogen ion exchange resins as catalysts in the hydration of olefins is well known as disclosed by Kreps et al. in U.S. Patent No. 2,477,380 and David W. Young in U.S. Patent No. 2,813,908. However, the rate of hydration and concentration of tertiary amyl alcohols resulting from the employment of these catalysts in the hydration of isoamylene in the presence of n-amylenes has left much to be desired.

I have now found that isoamylenes in admixture with n-amylenes can be selectively hydrated to tertiary amyl alcohol by contact with a sulfonated aryl synthetic cationic exchange resin if the reaction is conducted in the presence of a solubilizer which possesses both hydrocarbon and water solubility. The use of such a solubilizer enhances the rate of hydration and increases the concentration of tertiary amyl alcohol to near equilibrium amounts.

In accordance with the present invention, an isoamylene feed containing n-amylenes and water is contacted with a sulfonated synthetic aromatic cationic exchange resin catalyst under hydrating conditions of temperature and pressure and in the presence of a liquid solubilizer possessing both hydrocarbon and water solubility. The temperature employed is generally about 100 to 400° F., preferably 100 to 300° F. The pressure can vary widely say from 0 to about 2000 p.s.i.g., but it is preferred to use sufficient pressure to keep the water of hydration at least partially in the liquid phase. Ordinarily pressures of about 200 to 1000 p.s.i.g. are utilized. The water for hydration is generally employed in a mole ratio to the olefin feed of about 1–20:1, preferably about 1–10:1. The solubilizer of the present invention is present in an amount sufficient to enhance the rate of hydration and increase the concentration of tertiary amyl alcohol in the hydration product. Ordinarily this amount will fall in the range of about 1 to 20 volumes, preferably 2 to 10 volumes of solubilizer per volume of water utilized.

The sulfonated hydrogen ion exchange resin catalysts of the present invention are relatively high molecular weight water-insoluble resins or carbonaceous materials containing a —$SO_3H$ functional group or a plurality of such groups, probably or preferably attached to the aryl, e.g., benzene or fused-ring nucleus. These catalysts are exemplified by the sulfonated coals (Zeo-Karb H, Nalcite X, and Calcite AX) produced by the treatment of bituminous coals with sulfuric acid, and commercially marketed as zeolitic water softeners or base exchangers. These materials are usually available in a neutralized form, and in this case must be activated to the hydrogen form by treatment with mineral acid, such as hydrochloric acid, and water-washed to remove sodium and chloride ions prior to use. Sulfonated aromatic resin type catalysts include the reaction products of phenol-formaldehyde resins with sulfuric acid (Amberlite IR–1, Amberlite IR–100, and Nalcite MX). Also useful are the sulfonated aromatic resinous polymers of courmarone-indene with cyclopentadiene, sulfonated polymers of courmarone-indene with furfural, sulfonated polymers of courmarone-indene with cyclopentadiene and furfural, and sulfonated polymers of cyclopentadiene with furfural.

The preferred solid cationic exchange resin is a strongly acidic exchange resin consisting essentially of a sulfonated polystyrene resin, for instance a divinylbenzene cross-linked polystyrene matrix having about 0.5 to 20 percent, preferably about 4 to 16%, divinylbenzene therein to which are attached ionizeable or functional nuclear sulfonic acid groups. This resin is manufactured and sold commercially under various trade names, e.g., Dowex 50, Nalcite HCR. As commercially obtained, this resin has a moisture content of about 50% and it can be used in this form or it can be dried and then used with little or no difference in results ascertainable. The resin can be dried as by heating at a temperature of about 212° F. for 12 to 24 hours or the free water can be removed as by refluxing with benzene or similar solvents and then filtering.

The resin particle size is chosen with a view to the manipulative advantages associated with any particular range of sizes. Although a small size (200–400 mesh) is frequently employed in autoclave runs, a mesh size of about 20–50 or larger seems more favorable for use in fixed bed or slurry reactors. The catalyst concentration range in batch operation should be sufficient to provide the desired catalytic effect, e.g., between about 0.5 and 50 percent (dry basis) by weight of the reactants, with the preferred range being between about 5 to 25 percent (dry basis), for example, 10 percent. In continuous flow operations the amount of catalyst employed should be that providing a liquid hourly space velocity of about .01 to 20, preferably 0.1 to 10 volumes of liquid olefin per volume of catalyst per hour (LHSV).

The solubilizer of the present invention is a liquid oxygen-containing low molecular weight aliphatic hydrocarbon compound of, for example, up to 5 carbons, having both hydrocarbon and water solubility and which will not undergo reaction or be decomposed upon contact with the catalyst. Some of the more common solubilizers possessing these properties are: alcohols, such as the secondary and tertiary alcohols, for instance, isopropanol, isobutanol; ethers such as ethyl ether, propyl ether, ethyl propyl ether, ethyl isopropyl ether; ketones such as acetone, methyl ethyl ketone, etc.

The amount of n-amylenes in the isoamylene feed of the present invention can vary widely, but usually will be present in amounts of at least about 10%, preferably at least about 20% by weight. The isoamylenes in the feed can be present in a minor amount, even at least about 2 or 5% or less. Other hydrocarbons, such as normal and isoparaffins, can make up the rest of the feed of the present invention. A suitable feed may be obtained, for example, as a $C_5$ side cut from the distillation of the product resulting from the catalytic cracking of petroleum gas oil. This $C_5$ cut will generally be composed of about 20 to 55% of the isoamylenes (2-methylbutene-1, 2-methylbutene-2 and 3-methylbutene-1), about 10 to 50% n-pentenes and the remainder saturated $C_5$ hydrocarbons.

The tertiary amyl alcohol produced by the present process can be simply separated from the resulting liquid product, for instance, by distillation. Should isoamylene be the ultimate desired product, the tertiary amyl alcohol can be easily converted to isoamylene by conventional dehydration processes.

The following example is included to further illustrate the present invention:

Example

A 1:1 by weight blend of 2-methylbutene-2 and pentene-2 was hydrated over a sulfonated hydrogen ion exchange resin catalyst under the various conditions shown in Table I below. Runs were conducted in the presence and in the absence of isopropanol as a solubilizer. The catalyst employed was Dowex 50-X8, a sulfonated polystyrene-divinyl benzene resin containing 8% divinyl benzene having a mesh size of 20–50 and 45–55% water. The results are shown in Table I below. The data demonstrate the advantageous increase in concentration of tertiary amyl alcohol in the product provided by the utilization of the solubilizer of the present invention.

TABLE I
[Catalyst: Dowex 50-X8 resin exchange catalyst]

| Run 720– | 22A | 22B | 23B | 25 | 34 |
|---|---|---|---|---|---|
| Conditions: | | | | | |
| Temperature, °F | 150 | 190 | 225 | 150 | 150 |
| Pressure, p.s.i.g | 500 | 500 | 500 | 500 | 500 |
| LHSV | 0.5 | 0.5 | 0.4 | 0.4 | 0.4 |
| $H_2O$/HC, mol ratio | 1.8/1 | 1.8/1 | 5.3/1 | 4.7/1 | 1.7/1 |
| $i$-$C_3H_7OH$/$H_2O$, vol | | | | 1/10 | 3/1 |
| Feed | 1/1 blend of 2 methylbutene-2 and pentene-2 | | | | |
| Wt. Percent Product: | | | | | |
| Amylenes | 93.8 | 95.0 | 95.9 | 91.4 | 85.0 |
| Dimer | | | 0.6 | 0.8 | |
| t-Amyl alcohol | 6.2 | 5.0 | 3.5 | 7.8 | 15.0 |
| Primary and secondary amyl alcohol | 0 | 0 | 0 | 0 | 0 |
| Wt. percent 2-methyl-butene-2: t-Amyl alcohol | 12.4 | 10.0 | 7.0 | 15.6 | 30.0 |

I claim:

1. A process for the selective hydration to tertiary amyl alcohol of an isoamylene feed containing normal amylenes which comprises hydrating said feed with water in the presence of a sulfonated hydrogen ion exchange resin catalyst and in the presence of isopropanol, said hydration being conducted at a temperature of about 100 to 400° F., a pressure of from 0 to 2000 p.s.i.g. and a mole ratio of water to olefin feed of about 1–20:1, said sulfonated hydrogen ion exchange resin catalyst being present in an amount sufficient to provide a liquid hourly space velocity of about .01 to 20 and the isopropanol being present in an amount of about 1 to 20 volumes per volume of water.

2. A process for the selective hydration to tertiary amyl alcohol of an isoamylene feed containing normal amylenes which comprises hydrating said feed with water in the presence of a sulfonated polystyrene-divinylbenzene resin catalyst and in the presence of isopropanol, said hydration being conducted at a temperature of about 100 to 300° F., a pressure of about 200 to 1000 p.s.i.g., and a mole ratio of water to olefin feed of about 1–10:1, said catalyst being present in an amount sufficient to provide a liquid hourly space velocity of about 0.1 to 10, said isopropanol being present in an amount of about 2 to 10 volumes per volume of water.

References Cited by the Examiner

UNITED STATES PATENTS 2,042,212   5/1936   Deanesly _____ 260—641
2,477,380   7/1949   Kreps et al. _____ 260—641

FOREIGN PATENTS 489,205   12/1952   Canada.

OTHER REFERENCES

Kammermeyer et al., Alcohols by Hydration of Olefins, FIAT Final Report 968, Field Information Agency, Technical, April 2, 1947, pp. 8, 11, 20, 21, 22.

LEON ZITVER, *Primary Examiner.*